(12) United States Patent
Gutierrez et al.

(10) Patent No.: US 11,989,591 B2
(45) Date of Patent: May 21, 2024

(54) DYNAMICALLY CONFIGURABLE OVERPROVISIONED MICROPROCESSOR

(71) Applicant: Advanced Micro Devices, Inc., Santa Clara, CA (US)

(72) Inventors: Anthony Gutierrez, Seattle, WA (US); Vedula Venkata Srikant Bharadwaj, Bellevue, WA (US); Yasuko Eckert, Bellevue, WA (US); Mark H. Oskin, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 734 days.

(21) Appl. No.: 17/037,727

(22) Filed: Sep. 30, 2020

(65) Prior Publication Data

US 2022/0100563 A1    Mar. 31, 2022

(51) Int. Cl.
*G06F 9/50*    (2006.01)
*G06F 9/30*    (2018.01)
*G06F 9/38*    (2018.01)
*G06F 9/4401*    (2018.01)

(52) U.S. Cl.
CPC .......... *G06F 9/505* (2013.01); *G06F 9/30043* (2013.01); *G06F 9/3802* (2013.01); *G06F 9/3836* (2013.01); *G06F 9/4403* (2013.01); *G06F 9/4418* (2013.01)

(58) Field of Classification Search
CPC .... G06F 9/505; G06F 9/30043; G06F 9/3802; G06F 9/3836; G06F 9/4403; G06F 9/4418
See application file for complete search history.

(56) References Cited

U.S. PATENT DOCUMENTS

| 2008/0177424 A1 | 7/2008 | Wheeler |
| 2009/0094438 A1* | 4/2009 | Chakraborty ......... G06F 1/3243 |
| | | 712/30 |
| 2013/0014107 A1 | 1/2013 | Kirchhofer |
| 2013/0212282 A1 | 8/2013 | Pulier |

(Continued)

OTHER PUBLICATIONS

Muhammad Shafique, Dark Silicon as a Challenge for Hardware/Software Co-Design, Oct. 12-17, 2014; ACM (Year: 2014).*

(Continued)

*Primary Examiner* — Dong U Kim
(74) *Attorney, Agent, or Firm* — Hickman Becker Bingham Ledesma LLP (57) ABSTRACT

A dynamically configurable overprovisioned microprocessor optimally supports a variety of different compute application workloads and with the capability to tradeoff among compute performance, energy consumption, and clock frequency on a per-compute application basis, using general-purpose microprocessor designs. In some embodiments, the overprovisioned microprocessor comprises a physical compute resource and a dynamic configuration logic configured to: detect an activation-warranting operating condition; undarken the physical compute resource responsive to detecting the activation-warranting operating condition; detect a configuration-warranting operating condition; and configure the overprovisioned microprocessor to use the undarkened physical compute resource responsive to detecting the configuration-warranting operating condition.

20 Claims, 6 Drawing Sheets

(56) References Cited

U.S. PATENT DOCUMENTS

| | | | |
|---|---|---|---|
| 2016/0179560 A1 | 6/2016 | Ganguli | |
| 2018/0095751 A1* | 4/2018 | Aminot | G06F 9/30101 |
| 2019/0190463 A1* | 6/2019 | Smith | H03K 19/195 |
| 2020/0042287 A1* | 2/2020 | Chalamalasetti | G06N 3/065 |
| 2020/0204623 A1 | 6/2020 | Einkauf | |
| 2020/0285482 A1* | 9/2020 | Francois | G06F 9/3836 |
| 2021/0255891 A1* | 8/2021 | Henretty | G06F 8/45 |
| 2021/0378150 A1* | 12/2021 | Heydari | G05B 13/0265 |

OTHER PUBLICATIONS

Jorg Henkel, Dark Silicon—From Computation to Communication, ACM 2015 (Year: 2015).*

The International Searching Authority, "Search Report" in Application No. PCT/US2021/052462, dated Jan. 25, 2022, 9 pages.

Rambus Press, "A Closer Look at Rambus Cryogentic Memory Collaboration with Microsoft", https://www.rambus.com/blogs/a-closer-look-at-rambus-cryogenic-memory-collaboration-with-microsoft/, dated Apr. 17, 2017, 3 pages.

News Byte, "Intel and Qutech Unveil Detials of First Cryogenic Quantum Computing Control Chip, 'Horse Ridge'", https://newsroom.intel.com/news/, dated Feb. 18, 2020, 5 pages.

Microsoft Quantum, "Experience Quantum Impact with Azure Quantum", https://cloudblogs.microsoft.com/quantum/, dated Nov. 4, 2019, 6 pages.

Liu, Zhiye, "AMD Ryzen Threadripper 3990X's 64 Cores Overclocked to 5.5. GHz in World Record", https://www.tomshardware.com/news/amd-ryzen-threadripper-3990x-overclock-record, dated Feb. 7, 2020, 10 pages.

* cited by examiner

DYNAMICALLY CONFIGURABLE OVERPROVISIONED MICROPROCESSOR

TECHNICAL FIELD

Some embodiments of the present invention relate to general-purpose microprocessors such as central processing units (CPUs) in consumer-class personal computing devices and enterprise-class server computers. More particularly, some embodiments of the present invention relate to a dynamically configurable overprovisioned microprocessor.

BACKGROUND

Until recently, scaling for Complementary Metal-Oxide Semiconductor (CMOS) technology has progressed relentlessly. During this time, Metal-Oxide Semiconductor Field-Effect Transistors (MOSFETs) became smaller and transistor density increased in accordance with Moore's law. And yet the per-transistor dynamic switching power consumption also decreased in accordance with Dennard's scaling law. This allowed single core microprocessor chip designers and manufacturers to raise clock frequencies from one microprocessor generation to the next without significantly increasing overall power density.

Recently, the size of transistors has been reduced to the point that reaches the limit of Dennard scaling for single core microprocessors. In particular, at small transistor sizes (e.g., less than 65 nanometers), increased electrical current leakage and increased power density increases the thermal energy in the microprocessor threatening thermal runaway that destroys the chip itself. As a result, as transistor sizes continued to decrease along with the desire to increase compute workload performance, microprocessor chip designers and manufacturers focused less on increasing clock frequencies in single core microprocessors and focused more on multicore general-purpose microprocessor designs and specialized chips such as accelerators or application-specific integrated circuits (ASICs).

Unfortunately, these multicore designs are also approaching the limits of Dennard scaling. To keep within power constraints and avoid thermal runaway as transistor sizes get smaller and smaller and the transistor density increases in multicore designs, a portion of the multicore microprocessor transistors may be "dark" at any given time. More specifically, the larger power density of modern multicore designs facilitated by ever smaller transistor sizes hampers the ability to power-on all transistors simultaneously at a nominal operating voltage within Thermal Design Power (TDP) constraints. A substantial portion of the microprocessor may be dark at any given time (go unutilized). The dark portion is sometimes referred to as "dark silicon."

Cryogenic cooling of the microprocessor (e.g., using liquid nitrogen, liquid helium, or other suitable cryogen) reduces current leakage energy. This allows a greater percentage of all transistors to be powered-on simultaneously at a nominal voltage while remaining within TDP constraints. Cryogenic operation has other useful properties. In particular, transistors switch faster allowing the microprocessor to operate at higher clock frequencies and integrated circuit wires have less electrical resistance and consequently less signaling delay.

For many compute application domains, there is insatiable demand to cost-effectively reduce the compute time to solution. Such compute domains include, for example, machine learning, gaming, image and video editing, graph processing, among other compute application domains. One possible solution to meet this demand is to design and manufacture special-purpose microprocessors specifically designed to improve compute performance of certain compute workloads over more general-purpose microprocessors. One example of such a special-purpose microprocessor would one specifically designed for cryogenic operation only (e.g., using a cryogen between approximately 100- and 4-degrees Kelvin). However, it is generally not cost-effective to design and manufacture special-purpose microprocessors for different compute workloads because of the high overhead of design and fabrication.

The present invention address this and other needs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Some embodiments of the present invention are illustrated by way of example, and not in way by limitation, in the figures of the accompanying drawings and in which like reference numerals refers to similar elements and in which.

While the figures illustrate some embodiments of the present invention for purposes of illustrating clear examples, some embodiments of the present invention may omit, add to, reorder, or modify any of the elements shown in the figures.

DETAILED DESCRIPTION

In the following description, for the purposes of explanation, numerous specific details are set forth in order to provide a thorough understanding of some embodiments of the present invention. It will be apparent, however, that some embodiments of the present invention may be practiced without these specific details. In other instances, well-known structures and devices are shown in block diagram form in order to avoid unnecessarily obscuring some embodiments of the present invention.

GENERAL OVERVIEW

To provide for optimized multi-purpose processing capability using a general-purpose microprocessor design, a microprocessor is overprovisioned with physical compute resources such as more transistors, longer spans of control, and larger data storage structures. During operation, the overprovisioned microprocessor is dynamically configured to activate (undarken) compute resources. The activated compute resources are then used during operation to provide a more optimal compute workload performance for a given compute application or for a given portion of a compute application.

When the activated resources are no longer needed, the microprocessor can be dynamically configured to deactivate (darken) the resources to reduce energy consumption or to increase clock frequency. Over the course of processing a given compute workload, different compute resources may be dynamically activated and dynamically deactivated to balance among compute performance, energy consumption, and clock frequency.

In some embodiments of the present invention, the overprovisioned microprocessor is dynamically configured to activate compute resources in response to detecting an activation-warranting operating condition. One non-limiting example of an activation-warranting operating condition is cryogenic operation of the overprovisioned microprocessor. In this case, the overprovisioned microprocessor can be configured to dynamically activate compute resources such that alternative compute resources can be simultaneously active where one set of compute resources are currently used while the alternative set of compute resources are activated and available to be used. Having alternative compute resources simultaneously active enables efficient dynamic configuration of the overprovisioned microprocessor from using one set of compute resource to using the alternative set of compute resources without having to wait for the alternative set of compute resource to activate (undarken) after making the decision to configure. This and other activation-warranting operating conditions are discussed in greater detail below.

In some embodiments of the present invention, the overprovisioned microprocessor is dynamically configured to switch between use of compute resources in response to detecting a configuration-warranting operating condition. One non-limiting example of a configuration-warranting operating condition is underutilization of the reorder buffer. In this case, the overprovisioned microprocessor can be dynamically configured to switch from using compute resources for out-of-order instruction execution to using compute resources for in-order instruction execution. This and other configuration-warranting operating conditions are discussed in greater detail below.

Thus, techniques are provided for dynamic configuration of the overprovisioned microprocessor to optimally support a variety of different compute application workloads and with the capability to tradeoff among compute performance, energy consumption, and clock frequency on a per-compute application basis, using general-purpose microprocessor designs.

EXAMPLE MICROPROCESSOR

Figure 1:
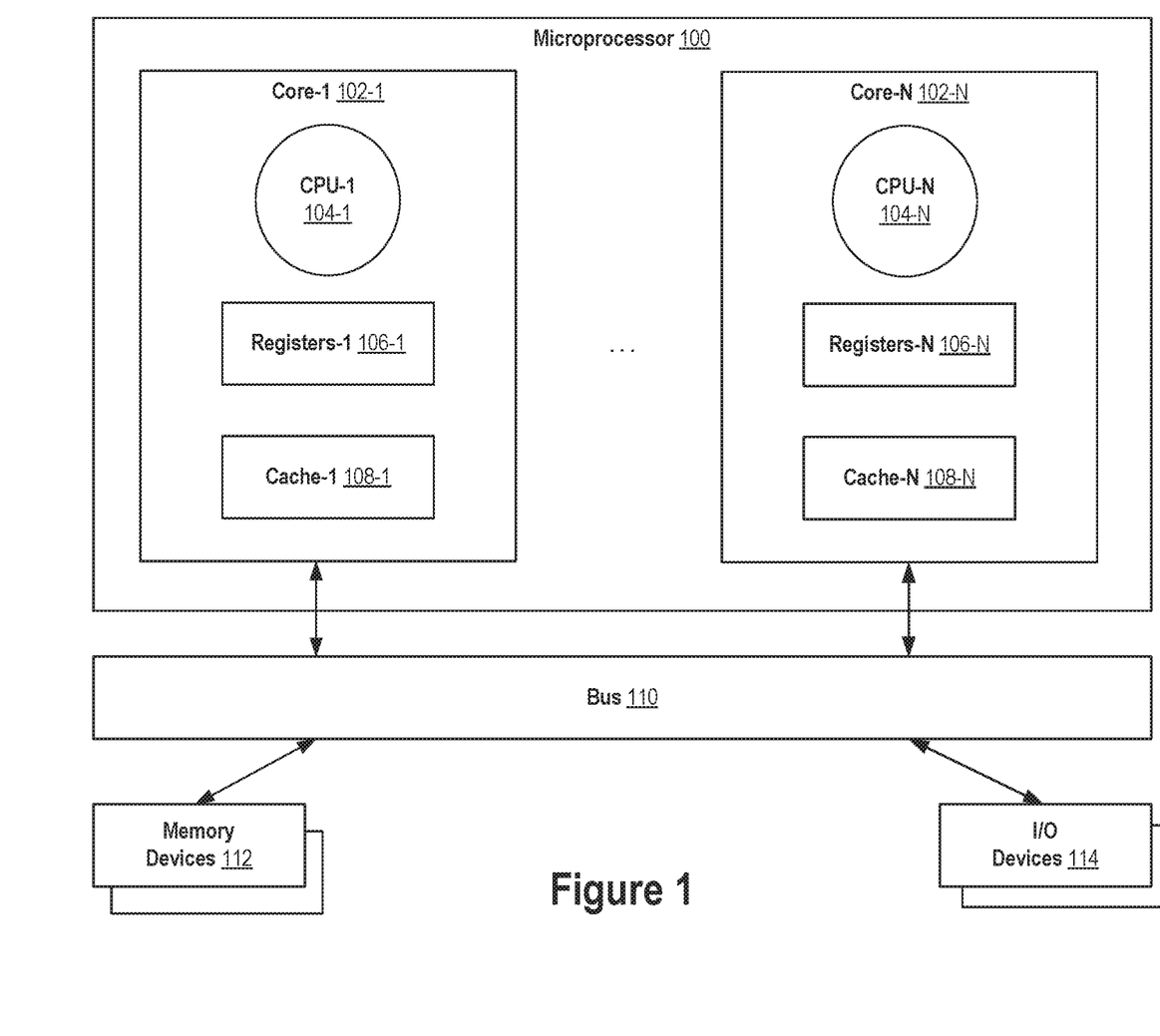
FIG. 1 is a schematic of an example microprocessor in which the techniques disclosed herein for a dynamically configurable overprovisioned microprocessor may be implemented, according to some embodiments of the present invention.

FIG. 1 is a schematic of example microprocessor 100 in which the techniques disclosed herein for a dynamically configurable overprovisioned microprocessor may be implemented, according to some embodiments of the present invention. As used herein, the term "dynamic" as in dynamically configured or dynamically reconfigured means that the overprovisioned microprocessor is configured or reconfigured during operation while executing one or more compute tasks (e.g., processes or threads) without having to restart the tasks. Instead, the overprovisioned microprocessor can continue executing the tasks after the configuration or reconfiguration.

Microprocessor 100 has two or more separate cores 102-1 . . . 102-N that support parallel processing and multitasking operation. Each core 102 has its own central processing unit 104, its own set of registers 106, and its own caches 108. The cores 102-1 . . . 102-N are physically coupled, possibly through one or more intermediate components that are not shown, to a bus 110 for sending and receiving data and commands between the cores 102-1 . . . 102-N and memory devices 112 and input/output devices 114.

Figure 2:
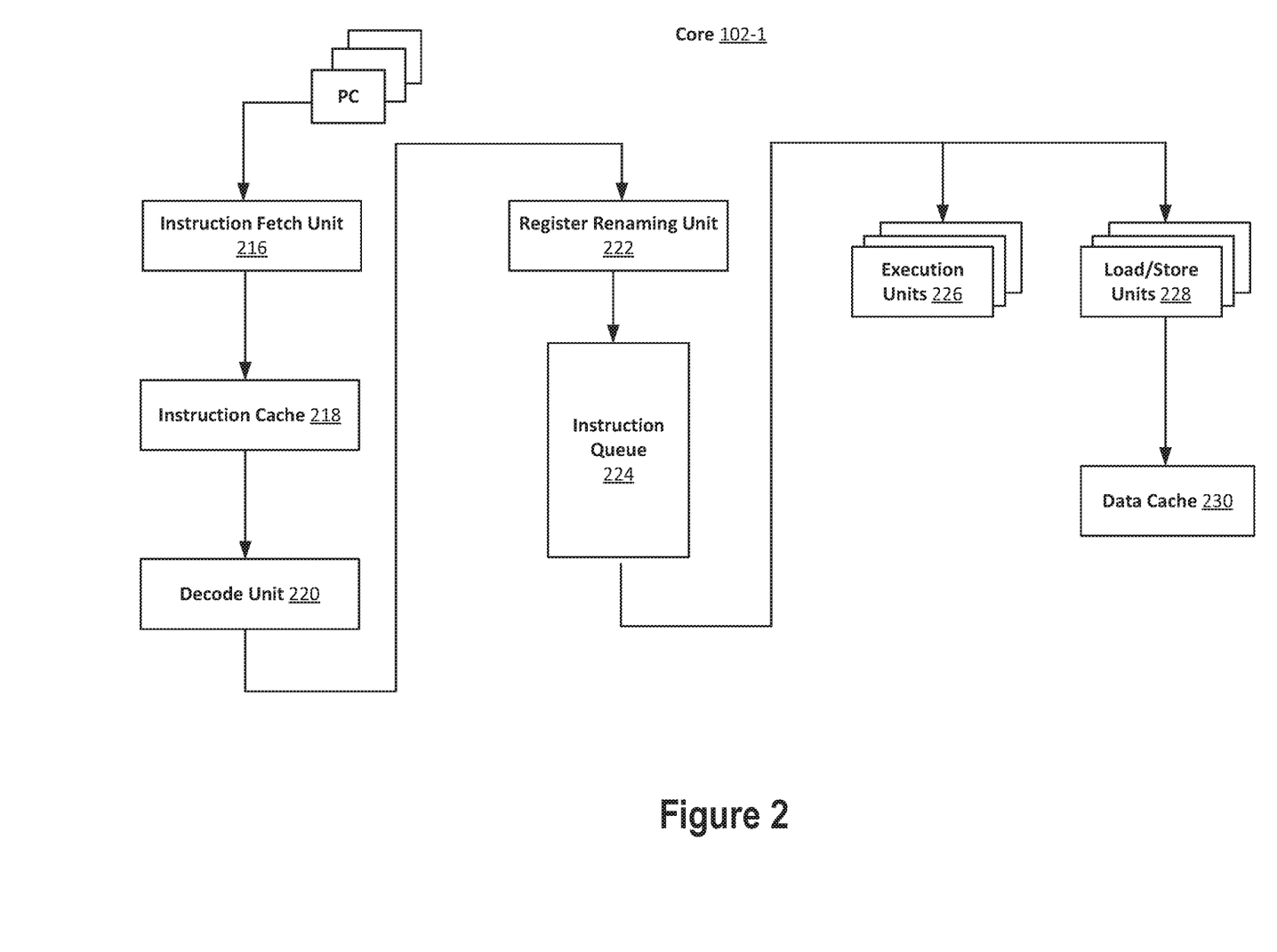
FIG. 2 is a schematic of a core of the example microprocessor of FIG. 1, according to some embodiments of the present invention.

FIG. 2 is a schematic of core 102-1, according to some embodiments of the present invention. Others cores 102 of microprocessor 100 may have the same or equivalent components. However, heterogeneous cores 102-1 . . . 102-N are also possible. Core 102-1 may be a multithreaded central processing unit (CPU) or a single-threaded core where microprocessor 100 is multithreaded. Core 102-1 may utilize general-purpose processor design techniques including, but not limited to, superscalar architecture, simultaneous multithreading, fine-grained multithreading, speculative execution, branch prediction, out-of-order execution, and/or register renaming. Core 100 may include physical compute resources for executing instructions according to a predefined instruction set architecture. For example, the predefined instruction set architecture may be any of: X86, ARM, POWERPC, MIPS, SPARC, RISC, or other complex or reduced instruction set architecture. A non-exclusive set of physical compute resources that may be included in core 100 may include instruction fetch unit 216, instruction cache 218, decode unit 220, register renaming unit 222, instruction queue 224, execution units 226, load/store units 228, data cache 230, and other circuitry of core 100. Other compute resources (not shown) that may be included in core 102-1 may include, but are not limited to, prefetch buffer, branch prediction logic, global/bimodal logic, loop logic, indirect jump logic, loop stream decoder, micro instruction sequencer, retirement register file, register allocation table, reorder buffer, reservation station, arithmetic logic unit, or memory order buffer.

The above-described microprocessor is presented for purposes of illustrating examples of a basic microprocessor in which some embodiments of the present invention may be implemented. However, it should be understood that other microprocessors including microprocessors with more, less, or different compute resources than those described above can be used in an implementation. Further, for purposes of discussion, the following description will present examples of a dynamically configurable overprovisioned microprocessor in a multicore microprocessor context. Some embodiments of the present invention, however, are not limited to any microprocessor configuration. In particular, a multicore microprocessor is not necessary to all embodiments of the invention but is used to provide a framework for discussion. Instead, some embodiments of the present invention can be implemented in any type of microprocessor or other integrated circuit capable of supporting the methodologies of embodiments presented in detail below.

OVERPROVISIONED MICROPROCESSOR

As illustrated by examples described below, in some embodiments of the present invention, microprocessor 100 is overprovisioned with physical compute resources. Here, "overprovisioned" encompasses microprocessor 100 having more physical compute resources than can powered-on simultaneously at a nominal operating voltage within a target Thermal Design Power (TDP) constraint. The target TDP constraint may be based on (assuming) non-cryogenic operation of microprocessor 100. For example, the target TDP may be based on "room temperature" operation where use of a cryogen (e.g., liquid nitrogen, liquid helium, etc.) between approximately 100- and 4-degrees Kelvin is not used.

In addition, or in the alternative, "overprovisioned" encompasses microprocessor 100 having long physical spans of control (long physical signaling wires) between compute resources. The physical lengths of the spans of control may be too long to meet signaling timing constraints at a target clock frequency of microprocessor 100 in room temperature operation. For example, the lengths may be too long to meet signaling timing constraints at the stated "on the box" clock frequency of microprocessor 100 in non-cryogenic operation. In non-cryogenic operation (e.g., room temperature operation), electrical resistance is greater in the spans of control than in cryogenic operation. As a result, to use these long spans of controls and still meet signaling timing constraints, the clock frequency of microprocessor 100 may need to be reduced (underclocked) or cryogenic operation of microprocessor 100 may be needed.

According to some embodiments of the present invention, microprocessor 100 is dynamically configurable to use long spans of control upon detecting that microprocessor 100 is in cryogenic operation or upon detecting that operating at the target clock frequency is not needed (e.g., because of extensive main memory I/O) and thus the operating clock frequency can be temporarily be reduced to allow use of the long spans of control. Long spans of control may be used to connect compute resources that are not typically connected to each other in this way because of timing constraints. By using long spans of control between compute resources that are not typically connected in this way, dynamic configurations of microprocessor 100 that take advantage of the long spans of control are possible. Examples of such dynamic configurations are described in greater detail below.

Overprovisioning of microprocessor 100 can take various forms. According to some embodiments of the present invention, at least three different forms are contemplated: (1) alternative compute resources, (2) long spans of control, and (3) expanded data storage structure headroom. Examples of each of these forms are provided in greater detail below.

ALTERNATIVE COMPUTE RESOURCES

In general, alternative compute resources are compute resources of overprovisioned microprocessor 100 that can be used in the alternative during operation. An example of alternative compute resources is in-order execution unit versus an out-of-order execution unit. With the techniques disclosed herein, microprocessor 100 can be overprovisioned with compute resources for both in-order execution and out-of-order execution and overprovisioned microprocessor 100 can be dynamically configured to use one or the other in response to detecting a configuration-warranting operating condition such as, for example, excessive stalling when using in-order execution compute resources. In this example, overprovisioned microprocessor 100 can be configured to use out-of-order execution compute resources. This and other examples of utilizing alternative compute resources in overprovisioned microprocessor 100 are described in greater detail below.

Another example of compute resources that can be used in the alternative is a simple load-store unit for in-order main memory access versus an associative load-store unit for parallel main memory access. With the techniques disclosed herein, microprocessor 100 can be overprovisioned with compute resources for both in-order memory access and out-of-order memory access and overprovisioned microprocessor 100 can be dynamically configured to use one or the other in response to detecting a configuration-warranting operating condition such as, for example, execution of compute-bound application when using out-of-order memory access compute resources. In this example, overprovisioned microprocessor 100 can be configured to use in-order memory access compute resources. This and other examples of utilizing alternative compute resources in overprovisioned microprocessor 100 are described in greater detail below.

LONG SPANS OF CONTROL

According to some embodiments of the present invention, microprocessor 100 can be overprovisioned with long spans of control that can be used to enable communication between compute resources that are typically not connected together. As illustrated by examples below, long spans of control may be used to implement dynamic configuration of overprovisioned microprocessor 100 between in-order execution and out-of-order execution and to implement dynamic configuration of overprovisioned microprocessor 100 between a single-threaded processing mode and a simultaneous multithreaded processing mode.

EXPANDED DATA STORAGE STRUCTURE HEADROOM

Microprocessor 100 may contain many data storage structures such as register files, rename tables, reorder buffers, load/store units, instruction queues, and other physical data storage structures that have a fixed number of entries for storing data items. The fixed number (which may vary between different structures) is typically determined during microprocessor design based on timing constraints at the target clock frequency and the target TDP in non-cryogenic operation. In some embodiments of the present invention, data storage structures are designed in overprovisioned microprocessor 100 to have an expanded number of entries so as to increase the data storage headroom of the structure. For example, overprovisioned microprocessor 100 can be dynamically configured to use an expanded register file. As another example, overprovisioned microprocessor 100 can be dynamically configured to use expanded data storage structures to increase the instruction window size. These and other examples of utilizing expanded data storage structures in overprovisioned microprocessor 100 are described in greater detail below.

DYNAMIC CONFIGURATION LOGIC

According to some embodiments of the present invention, overprovisioned microprocessor 100 is configured with one or more dynamic configuration logics for dynamically configuring physical compute resources of microprocessor 100. A dynamic configuration logic can be implemented with firmware, finite-state machine logic, or other suitable logic. Different dynamic configuration logics may dynamically configure different compute resources and a single dynamic configuration logic may be responsible for dynamically configuring multiple compute resources.

According to some embodiments, a physical compute resource of microprocessor 100 that can be dynamically configured by a dynamic configuration logic may be one that is capable of being power gated. Power gating refers to techniques in microprocessors for reducing leakage power dissipation by compute resources when the compute resources are not being used. Power gating can be implemented in microprocessor 100 using P-type Metal-Oxide Semiconductor (PMOS) or N-type Metal-Oxide Semiconductor (NMOS) sleep transistors, for example. Alternatively, other circuit techniques may be used to place a physical compute resource in a drowsy state, sleep state, or other low-power state. For example, voltage scaling techniques to reduce static power consumption by a compute resource described in following paper may be applied to alternative the compute resource between active and drowsy states: K. Flautner, Nam Sung Kim, S. Martin, D. Blaauw and T. Mudge, "Drowsy caches: simple techniques for reducing leakage power," *Proceedings 29th Annual International Symposium on Computer Architecture,* Anchorage, AK, USA, 2002, pp. 148-157. A potential benefit of using this voltage scaling technique is fewer number of clock cycles needed to transition the compute resource between active and drowsy states when compared to the power gating.

POWER STATES

Figure 3:
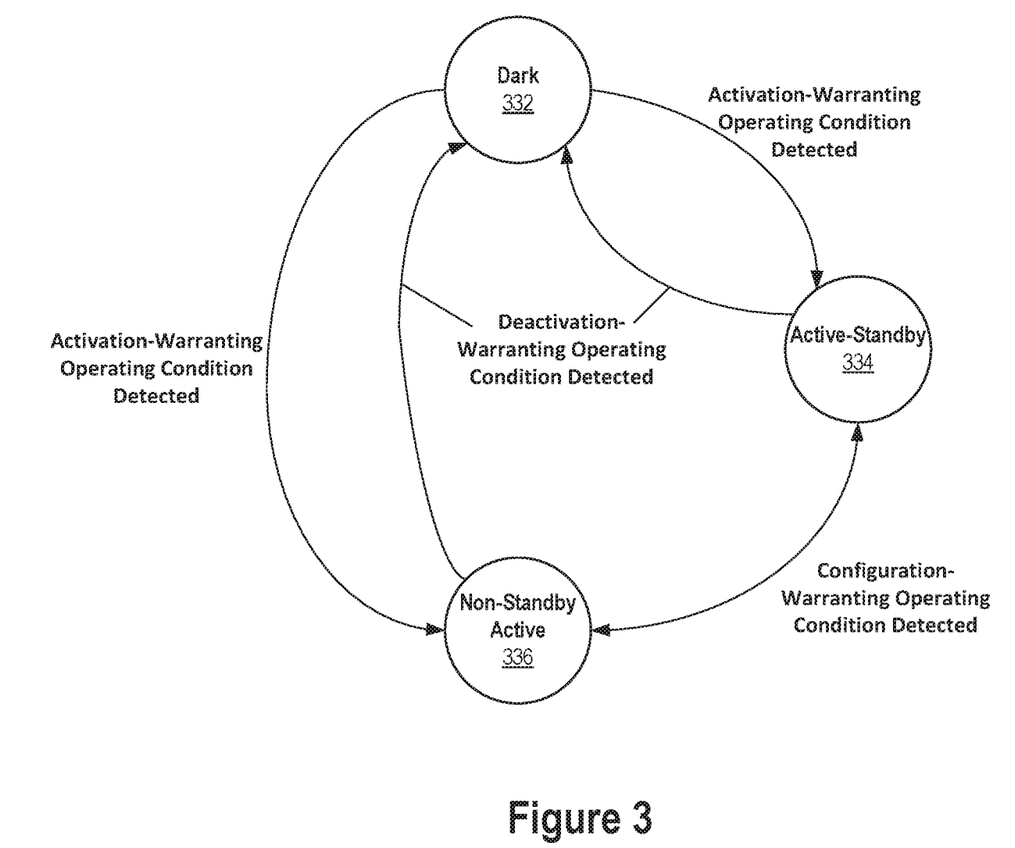
FIG. 3 is a state diagram of some possible states of a compute resource as managed by a dynamic configuration logic for the compute resource in the microprocessor of FIG. 1, according to some embodiments of the present invention.

FIG. 3 is a state diagram of some possible power states of a compute resource managed by a dynamic configuration logic for the compute resource, according to some embodiments of the present invention. Initially, the compute resource may be in the dark state 332. When in the dark state 332, the compute resource may be power gated and is not being used for compute tasks.

Upon the dynamic configuration logic detecting an activation-warranting operating condition, the dynamic configuration logic may transition the compute resource from being in the dark state 332 to being active but in a low-power standby mode (in the active-standby state 334). Alternatively, the dynamic configuration logic may transition the compute resource directly to the non-standby active state 336. In either case, undarkening the compute resource out of the dark state 332 may include the dynamic configuration logic removing the power gate on the compute resource.

Various different activation-warranting operating conditions are possible and no particular activation warranting operating condition is required. Examples of some activation warranting operating conditions include the dynamic configuration logic detecting cryogenic operation of microprocessor 100, the dynamic configuration logic receiving or obtaining a command to activate the compute resource (e.g., via an instruction set architecture (ISA) command or via memory-mapped I/O), or the dynamic configuration logic detecting a configuration-warranting operating condition that warrants using the compute resource.

If the dynamic configuration logic detects a configuration-warranting operating condition that warrants using the compute resource and the compute resource is then in the dark state 332, then dynamic configuration logic may treat the configuration-warranting operating condition as an activation-warranting operating system for purposes of transitioning the compute resource directly from being in the dark state 332 to the non-standby active state 336 or first transitioning the compute resource from being in the dark state 332 to the active-standby state 334 and then to the non-standby active state 336.

On the other hand, if the compute resource is already in the active-standby state 334 when the configuration-warranting operating condition is detected by the dynamic configuration logic, then the dynamic configuration logic can transition the compute resource from the active standby state 334 to the non-standby active state 336. This transition may be accomplished by the dynamic configuration logic removing a clock gate on the compute resource or by the dynamic configuration logic transitioning the compute resource out of a drowsy state into an active state using voltage scaling techniques.

The dynamic configuration logic may configure microprocessor 100 to no longer use the compute resource upon detecting a configuration-warranting operating condition. In this case, the compute resource may transition back to the active standby state 334. For this transition from the non-standby active state 336 to the active standby state 334, the dynamic configuration logic can clock gate the compute resource or transition the compute resource from an active state to a drowsy state using voltage scaling techniques.

Alternatively, if the dynamic configuration logic detects a deactivating-warranting operating condition for a compute resource that is the non-standby active state 336, then the dynamic configuration logic may power gate the compute resource to directly transition the compute resource to the dark state 332.

When the compute resource is in the active standby state 334, dynamic configuration logic may clock gate the compute resource to conserve power consumption. Clock gating refers to techniques in microprocessors for reducing power dissipation by compute resources when the compute resources are not being used. Clock gating can be implemented in microprocessor 100 by removing the clock signal from a compute resource when not in use, for example. When a physical compute resource is clock gated, power is provided to the circuitry but clock pulses that drive the circuit are blocked. By doing so, energy consumed due to circuit switching is reduced or eliminated but leakage power is still consumed. In contrast to clock gating, power gating blocks the power signal, and thus current, into the circuitry. Power gating typically requires transition between power states, which is typically physically a more time-consuming process (higher latency process) than (clock gating) enabling and disabling the clock pulses to the circuitry. Thus, clock gating can used to more efficiently transition a physical compute resource between the active-standby state 334 and the non-standby state 336.

While clocking gating may be used to transition a physical compute resource between the active-standby state 334 and the non-standby active state 336, other techniques may be used to transition the physical compute resource between these states such as the voltage scaling techniques referred to above for transitioning a physical compute resource between active and drowsy states. In this case, the drowsy voltage scaling state would correspond to the active standby state 334 and the active voltage scaling state would correspond to the non-standby active state 336.

According to some embodiments of the present invention, the dynamic configuration logic is a programmable epoch-based system in which the dynamic configuration logic checks regularly for activation-warranting, deactivation-warranting, or configuration-warranting operating conditions for the compute resource. For example, the dynamic configuration logic may check for one or more of these conditions every few clock cycles or every few nanoseconds. The periodicity of these checks could also change over time in response to the dynamic configuration logic detecting conditions warranting in increase or decrease in how frequently to make these checks. The check frequency may also be controlled from higher-level logic such as, for example, by high-level language programmed instructions or high-level language compiler added instructions to the set of instructions being executed by microprocessor 100.

HYBRID IN-ORDER/OUT-OF-ORDER CPU DESIGN

According to some embodiments of the present invention, a CPU (e.g., 104-1) of a core (e.g., 102-1) of overprovisioned microprocessor 100 encompasses a hybrid in-order/out-of-order CPU design. In particular, microprocessor 100 is overprovisioned with both in-order execution compute resources and out-of-order execution compute resources and dynamic configuration logic of the CPU dynamically configures the CPU to be either an in-order or an out-of-order instruction execution machine.

In general, when the CPU is in in-order instruction execution mode, compute application instructions are fetched, executed, and committed in compiler-generated order. If an instruction stalls (e.g., waiting for data from main memory), all instructions behind it also stall. Instructions are statistically scheduled by the CPU in compiler-generated order. Advantages of in-order instruction execution include simpler implementation, fast clock cycles, fewer compute resources, and lower cost design, development, and debug time.

On the other hand, when the CPU is in out-of-order instruction execution mode, compute application instructions may still be fetched in compiler-generated order. However, instruction completion may be in-order or out-of-order. Instructions are dynamically scheduled by the CPU. The CPU decides in what order instructions can be executed and instructions behind a stalled instruction can pass it in execution order if not dependent on the stalled instruction. Advantages of out-of-order execution include higher performance for certain compute workloads with high levels of instruction level parallelism and few instruction dependencies. Other benefits potentially include latency hiding, less processor stalling, and higher utilization of execution (functional) units.

When using in-order instruction execution compute resources, out-of-order instruction execution compute resources can be dark. Alternatively, when using out-of-order instruction execution compute resources, in-order instruction execution compute resources can be dark. If operating conditions permit to be within the target TDP such as in cryogenic operation or at lower (underclocked) clock frequencies, then both in-order instruction execution compute resource and out-of-order instruction execution compute resources can be kept activated while one of them is being used. In this case, dynamic configuration between using in-order instruction execution compute resource and using out-of-order instruction execution compute resources does not incur the overhead of transitioning compute resources from dark to active. For example, the overhead of power gating is avoided.

Dynamic configuration of the CPU between an in-order instruction execution issue machine or an out-of-order instruction execution issue machine may encompass dynamic configuration of control and data paths, as well data storage structures such as instruction queues, renaming tables, and the reorder buffer. When the CPU is executing a compute application with high inherent instruction level parallelism and relatively few data dependencies, then this may be a configuration-warranting operating condition that triggers the dynamic configuration logic to configure the CPU to be an out-of-order instruction execution issue machine to obtain the benefits of speculation and dynamism provided by out-of-order instruction execution operation. However, if this speculation and dynamism is no longer needed by the compute application, then this also may be a configuration-warranting operating condition that triggers the dynamic configuration logic to dynamically configure the CPU to be an in-order instruction execution issue machine to avoid the overhead of out-of-order instruction execution mode.

As mentioned above, when the CPU is in either in-order instruction execution mode or out-of-order instruction execution mode, the alternative compute resources such as certain data and control paths and data storage structures not used in the current mode can be brought dark to conserve power. However, when leakage current is reduced such as, for example, in cryogenic operation or at underclocked clock frequencies, clock gating or other low power states can be used with minimal power overhead to keep the currently unused compute resources active. By doing so, if the dynamic configuration logic determines to dynamically configure the CPU to switch from in-order instruction execution mode to out-of-order instruction execution mode, or vice versa, this can be done quickly without having to undarken compute resources.

Figure 4:
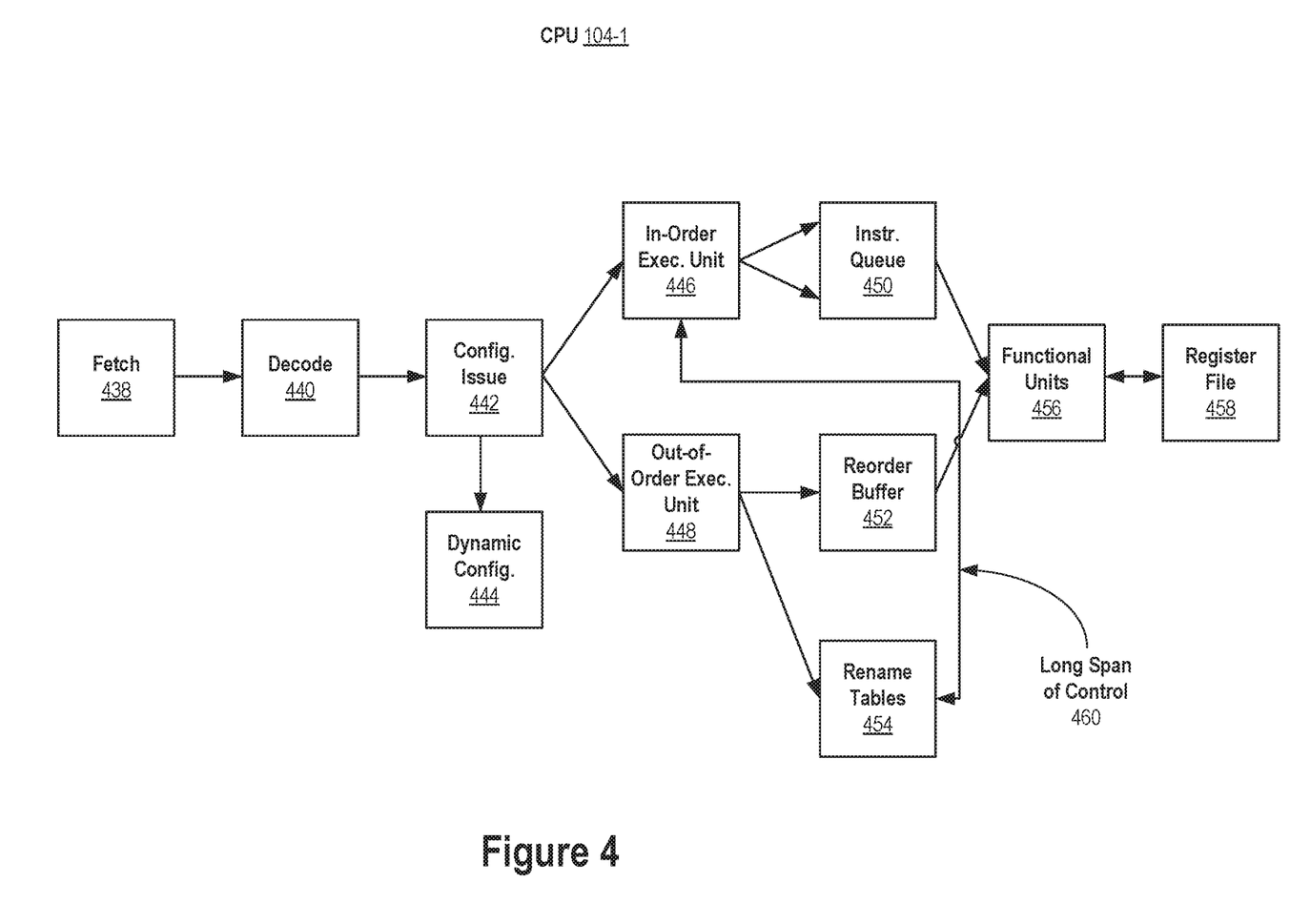
FIG. 4 is a schematic of a dynamically configurable hybrid in-order/out-of-order CPU of a core of the microprocessor of FIG. 1, according to some embodiments of the present invention.

FIG. 4 is a schematic of hybrid in-order/out-of-order CPU 104-1 of core 102-1 of microprocessor 100, according to some embodiments of the present invention. CPU 104-1 has an instruction fetch unit 438 for fetching the next instruction from a memory address that is stored in a program counter and storing the fetched instruction in an instruction register. CPU-1 also has an instruction decode unit 440 for interpreting the fetched instruction. Configurable issue unit 442 can issue the decoded instruction to in-order instruction execution unit 446 or out-of-order instruction execution unit 448 depending on the current configuration by dynamic configuration logic 444.

Dynamic configuration logic 444 can dynamically configure configurable issue unit 442 to issue instructions to in-order instruction execution unit 446 for in-order instruction execution or to out-of-order instruction execution unit 448 for out-of-order instruction execution upon detecting a configuration-warranting operating condition. For example, dynamic configuration logic 444 may track the number of instruction execution stalls during an epoch of a number of clock cycles or a number of nanoseconds. If the number of stalls during the epoch exceeds a threshold and configurable issue unit 442 is currently in in-order instruction execution mode, then dynamic configuration logic 444 can dynamically configure configurable issue unit 442 to issue instructions to out-of-order instruction execution until 448 until dynamic configuration logic 444 detects a configuration-warranting operating condition that warrants switching back to in-order instruction execution mode. For example, dynamic configuration logic 444 might detect an instruction passed from instruction decode unit 440 that requests in-order instruction execution. Such an instruction might be inserted into the compute application or added to the set of compute application instructions by a compiler or runtime instruction profiler based on the expectation that subsequent instructions of the compute application to be executed do not have a high-degree of instruction level parallelism and thus, the overhead of out-of-order instruction execution is not warranted for these subsequent instructions.

For example, a high-level programming language compiler may determine during an optimization or profiling pass that the instruction schedule generated by the compiler for a window of instructions has little or no register dependencies. In this case, the compiler may insert an instruction or otherwise configure the compiled instructions to select in-order instruction execution for executing the window of instructions. On the other hand, if the compiler generates a complicated instruction schedule with many register dependencies (e.g., a number of register dependencies above a threshold), then the compiler can insert an instruction or otherwise configure the compiled instructions to select out-of-order instruction execution for executing the window of instructions.

CPU 104-1 may include other compute resources associated with in-order instruction execution unit 446 and out-of-order instruction execution unit 448. Such other compute resources may include instruction queue 450, reorder buffer 452, rename tables 454, functional units 456, and register file 458.

In CPU 104-1, the compute resources supported in-order instruction execution 446 and out-of-order instruction execution 448 share frontend logic such as instruction fetch unit 438, decode instruction unit 440, configurable issue unit 442, and dynamic configuration logic 444. In-order instruction execution unit 446 and out-of-order instruction execution unit 448 can have respective private compute resources. For example, only out-of-order instruction execution unit 448 is likely perform register renaming using rename tables 454 and reorder buffer 452. In-order instruction execution unit 446 and out-of-order instruction execution unit 448 may also use their own respective register files 458 (e.g., to increase port width), or these units can share a register file 458.

Long span of control 460 is an example of a long span of control that may be useable only in certain operating conditions such as in cryogenic operation (where electrical resistance is lower) or at lower (underclocked) clock frequencies. Long span of control 460 allows transfer of register state information between rename tables 454 and in-order instruction execution unit 446 when switching from out-of-order instruction execution and in-order instruction execution. The register state information may include, for example, logical register identifiers in rename tables 454 that in-order instruction execution unit 446 resolves to physical register identifiers to be used for in-order instruction execution.

CONFIGURABLE MEMORY-LEVEL PARALLELISM

According to some embodiments, a load-store (LS) unit of CPU (e.g., 104-1) of a core (e.g., 102-1) of microprocessor 100 for holding memory instructions may be overprovisioned with additional queue entries that can be activated (undarkened) in certain operating conditions such as in cryogenic operation (where electrical resistance is lower) or at lower (underclocked) clock frequencies. The extra capacity/width in the queue for storing memory requests (e.g., loads and stores) allows microprocessor 100 to provide enhanced memory-level parallelism.

In addition, or alternatively, the CPU can be overprovisioned with: (1) a simple Load-Store (LS) unit, and (2) an associative Load-Store (LS) unit. For compute applications or portions of compute applications that require in-order memory access, have limited memory level parallelism because they are compute bound, have data dependencies, have difficult to predict branches, or have unpredictable memory access patterns, then the simple LS unit can be used for these applications or these portions. On the other hand, the associate LS unit with more enhanced memory scheduling and arbitration functionality can be used for compute applications or portions of compute applications that have a high degree of memory level parallelism.

When the CPU is using the simple LS unit compute resources, the associate LS unit compute resources can be dark. Alternatively, when the CPU is using the associative LS unit compute resources, the simple LS unit compute resources can be dark. If operating conditions permit to be within the target TDP such as in cryogenic operation or at lower (underclocked) clock frequencies, then both the simple LS unit compute resource and the associative LS unit compute resources can be kept activated while one of them is being used. In this case, configuring between the simple LS unit compute resources and the associative LS unit compute resources does not incur the overhead of transitioning compute resources from dark to active. For example, the overhead of power gating is avoided.

The CPU may include dynamic configuration logic for dynamically configuring he CPU between using the simple LS unit and the associative LS unit. When the CPU is executing a compute application with high inherent memory level parallelism and relatively few data dependencies, then this may be a configuration-warranting operating condition that triggers the dynamic configuration logic to configure the CPU to switch from using the simple LS Unit to using the associative LS Unit. However, if the scheduling and arbitration of the associative LS unit is no longer needed by the compute application, then this also may be a configuration-warranting operating condition that triggers the dynamic configuration logic to dynamically configure the CPU to use the simple LS unit.

As mentioned above, when the CPU is using either the simple LS unit or the associative LS unit, the alternative compute resources such as certain data and control paths and data storage structures not used by the current mode can be brought dark to conserve power. However, when leakage current is reduced such as, for example, in cryogenic operation, clock gating or other low power states can be used with minimal power overhead to keep the currently unused compute resources active. By doing so, if the dynamic configuration logic determines to dynamically configure the CPU to switch from using the simple LS unit to the associative LS unit, or vice versa, this can be done quickly without having to undarken compute resources.

Figure 5:
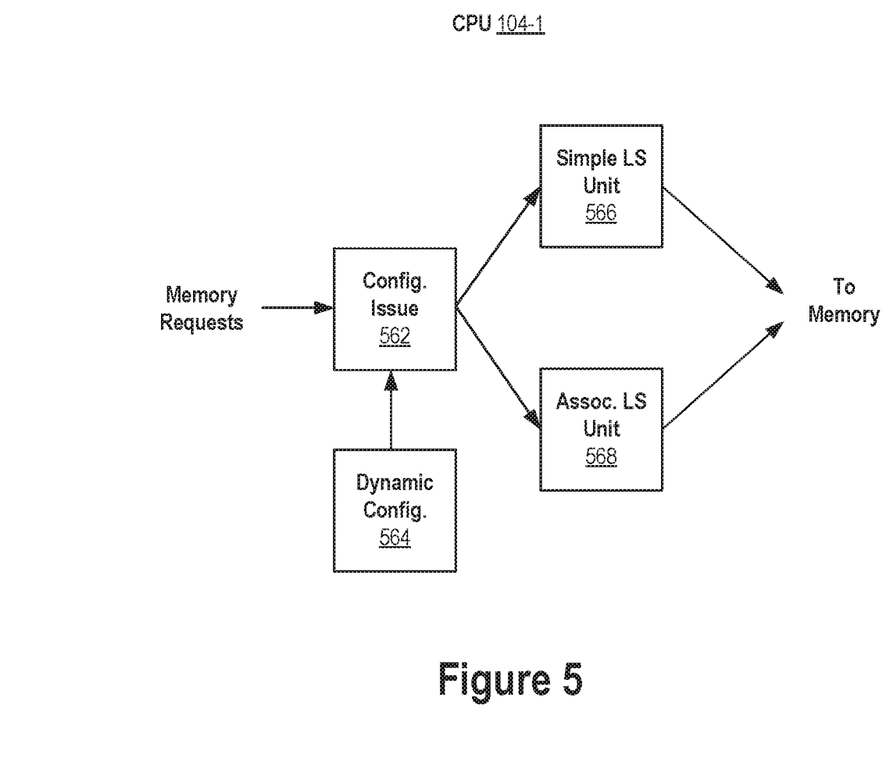
FIG. 5 is a schematic of a dynamically configurable memory-level parallelism unit within the CPU of a core of the microprocessor of FIG. 1, according to some embodiments of the present invention.

FIG. 5 is a schematic of a configurable load/store (LS) unit within CPU 104-1 of core 102-1 of microprocessor 100, according to some embodiments of the present invention. CPU 104-1 has a configurable memory request issue unit 562 that receives requests for memory access (e.g., loads and stores). Configurable issue unit 562 is dynamically configured by dynamic configuration logic 564 to issue memory requests to simple LS unit 566 or associative LS unit 568 depending on the current configuration. Associative LS unit 568 may include enhanced memory scheduling or arbitration logic. Such logic can be configured to various memory order including multiple consistency models or store/load forwarding.

For example, dynamic configuration logic 564 can dynamically configure configurable issue unit 562 to issue memory access requests to simple LS unit 566 or to associative LS unit 568 upon detecting a configuration-warranting operating condition. For example, dynamic configuration logic 564 may track the utilization of functional units over time. If the functional units are currently underutilized and the configurable issue unit 562 is currently in associative LS mode, then there is likely not sufficient memory-level parallelism in the instructions being executed. Accordingly, dynamic configuration logic 564 can dynamically configure configurable issue unit 562 to switch to using simple LS unit 566 to avoid the energy and compute overhead of associative LS unit 568.

For example, dynamic configuration logic 562 can dynamically configure configurable issue unit 562 to issue memory access requests to simple LS unit 566 or to associative LS unit 568 upon detecting a configuration-warranting operating condition. For example, dynamic configuration logic 562 may track the utilization of functional units over time. If the functional units are currently underutilized and the configurable issue unit 562 is currently in associative LS mode, then there is likely not sufficient memory-level parallelism in the instructions being executed. Accordingly, dynamic configuration logic 564 can dynamically configure configurable issue unit 562 to switch to using simple LS unit 566 to avoid the energy and compute overhead of associative LS unit 568.

Other possible configuration-warranting operating conditions for switching between simple LS unit 566 and associate LS Unit 568 include by a compiler-directive, instruction, or hint inserted by a high-level programming language compiler into the executed instructions. For example, if the compiled instructions have a high rate of memory instructions (e.g., in terms of memory operations per total operations in a window of compiled instructions), then the compiler can insert an instruction or hint into the compiled code to indicate that a larger load-store queue be used for a window of instructions. On the other hand, if the window of instructions has a low rate of memory instructions, then the instruction or hint can indicate that a normal-sized or lower-sized load-store queue be used for the window of instructions.

If the compiler can resolve addresses for memory instructions well, and if the compiler determines that there are many independent addresses in a window of instructions, then the compiler could instruct, or hint, that associative LS unit 568 be used for the window to increase memory-level parallelism for the window. If the compiler has difficulty resolving memory addresses at compile time for a window of instructions, it may prefer simple LS unit 566 mode when window is executed to avoid utilizing the reordering logic or forwarding logic of associate LS Unit 568 inefficiently.

Address prediction techniques or execution-time address profiling using performance counters that track addresses observed can be utilized by dynamic configuration logic. If there are phases of high memory-level parallelism detected during execution of the application program, this can be detected by dynamic configuration logic and a transition from using simple LS unit 566 to associate LS Unit 568 can be made. Conversely, if microprocessor 100 is doing a poor job of utilizing the complex logic in the associate LS unit 568, a transition to using simple LS unit 566 can be made by dynamic configuration logic. Dynamic configuration logic may also dynamically configure the queues or other data storage structures of simple LS unit 566 and associative LS unit 568 to activate or use extra overprovisioned entries upon detecting a configuration-warranting operating condition. For example, the dynamic configuration logic may activate and dynamically configure simple LS 566 or associative LS unit 568 to use the extra overprovisioned entries to provide more width (greater possible memory-level parallelism) to the simple LS unit 566 or the associative LS unit 568 for memory access requests upon detecting that microprocessor 100 is in cryogenic operation or upon detecting that microprocessor 100 is being underclocked. Upon detecting that microprocessor 100 is no longer in cryogenic operation or no longer being underclocked, the dynamic configuration logic may dynamically configure simple LS 556 or associative LS unit 568 to no longer use the extra overprovisioned entries.

CONFIGURABLE SIMULTANEOUS MULTITHREADING PROCESSOR

Compute applications can be programmed to execute in both a single-threaded manner and a multi-threaded manner. During execution, the compute application may switch back and forth between single-threaded execution and multi-threaded execution. According to some embodiments of the present invention, a single CPU design can be overprovisioned with pipeline compute resources for optimizing both single-threaded execution and multi-threaded execution.

Figure 6:
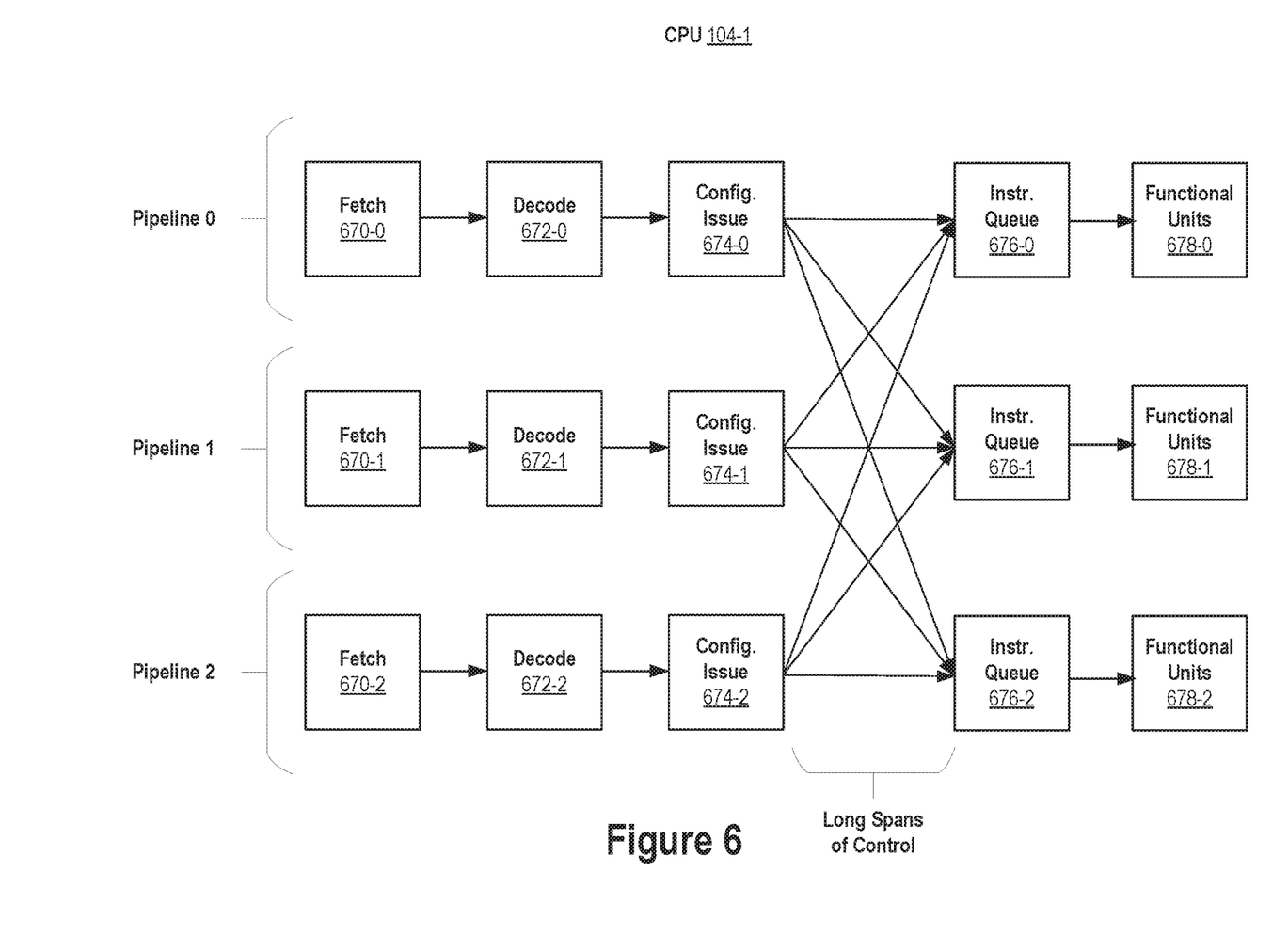
FIG. 6 is a schematic of a dynamically configurable simultaneous multithreading unit within the CPU of a core of the microprocessor of FIG. 1, according to some embodiments of the present invention.

FIG. 6 is a schematic of a configurable simultaneous multithreading CPU 104-1 of core 102-1 of microprocessor 100, according to some embodiments of the present invention. CPU 104-1 has multiple hardware instruction pipelines to support multiple simultaneous threads of execution. Each pipeline has its own instruction fetch unit 670, its own instruction decode unit 672, its own configurable instruction issue unit 674, its own instruction queue 676, and its own set of functional units 678. In addition, CPU 104-1 is overprovisioned with long spans of control from each configurable instruction issue unit 674 to one or more other hardware pipelines. In the example of FIG. 6, each configurable instruction issue unit 674 is connected by long spans of control to each other hardware pipeline. However, it is possible for a configurable instruction unit 674 to be connected by long spans of control to less than all other pipelines.

With this, if CPU 104-1 is executing a single-threaded compute application or a single-threaded portion of a compute application in one of the pipelines, then the front end compute resources of the other pipelines can be brought dark or active but in a low power state (e.g., clock gated) when the front end compute resources are not being used to conserve power. The front-end compute resources include the instruction fetch unit 670, the instruction decode unit 672, and the configurable instruction issue unit 674.

Also, in this situation, the configurable instruction issue unit 674 of the pipeline being used to execute the single thread can issue instructions to the back ends of the unused pipelines. This may be done so use the functional units 678 of the other pipelines can be used to execute instructions of the single thread. The instructions can be issued to the back ends of the other pipelines over long spans of control which may be usable in cryogenic operation or at underclocked clock speeds.

For example, if Pipeline 0 is executing the single-thread, then front-end units 670-0, 672-0, and 674-0 as well as back end units 676-0 and 678-0 of Pipeline 0 may be used to fetch, decode, issue, and execute instructions of the single-thread. During this time, the front-end units 670-1, 672-01, 674-1 of Pipeline 1 and the front-end units of 670-2, 670-2, and 674-2 of Pipeline 2 may be brought dark or in a low-power state as they are not being used to conserve power. However, the back-end units 676-1 and 678-1 and 676-2 and 678-2 may be used during this time. In particular, upon detecting a configuration-warranting operating condition that indicates that the functional units 678-0 of Pipeline 0 are close to being fully utilized or are fully utilized, configurable instruction issue unit 674-0 can dynamically configured to begin issuing instructions over long spans of control to the back ends of the other pipelines (e.g., Pipeline 1 or Pipeline 2). This way, Pipeline 0 can utilize the functional units 678-1 or 678-2 of the other pipelines in addition to its own set of functional units 678-0 when executing a single-threaded application or portion thereof. This increases the overall instruction throughput of the single thread.

If the compute application begins spawning threads for multiple threads of execution, then the front ends of the other pipelines (e.g., Pipeline 1 or Pipeline 2) can be used so that the multiple threads can execute simultaneously on separate pipelines. In this case, configurable instruction issue unit 674-0 can dynamically configured to no longer issue instructions over klong spans of control to the back ends of the other pipelines (e.g., Pipeline 1 or Pipeline 2) as those back ends will be used by threads executing on those pipelines.

It should be noted that the configurable simultaneous multithreading CPU 104-1 of FIG. 6 can be combined together with the hybrid in-order/out-of-order CPU 104-1 of FIG. 4. In this configuration, each pipeline can be overprovisioned with both in-order and out-of-order instruction execution units and associated compute resources. Configurable instruction issue units 674 can switch between in-order instruction issue and out-of-order instruction issue within their respective pipelines and across pipelines when in single-threaded mode. For example, the instruction execution throughput of instructions of a single-threaded application having a low-level of instruction level parallelism can be improved by using the in-order instruction execution units of other pipelines in addition to the in-order instruction execution units of the pipeline on which the single thread is executing.

CONFIGURABLE REGISTER FILE SIZE

According to some embodiments of the present invention, a register file of a CPU (e.g., 104-1) of a core (e.g., 102-1) of microprocessor 100 is overprovisioned with additional entries that can be activated (undarkened) in certain operating conditions such as in cryogenic operation (where electrical resistance is lower) or at lower (underclocked) clock frequencies. The extra capacity/width in the register file allows microprocessor 100 to increase the utilization of other compute resources. For example, in addition to an overprovisioned register file, microprocessor 100 can also be overprovisioned with more functional units, functional unit schedulers, instruction queue entries, branch predictor table entries, pre-fetcher table entries, reorder buffer entries, on-chip cache entries, load-store queue entries, cache way predictor entries, op code cache entries, or fetch buffer entries. In addition, the size (data capacity) of latches, flip-flips, SRAM structures, CAM structures, or the like can be increased.

CONFIGURABLE INSTRUCTION WINDOW SIZE

According to some embodiments of the present invention, a configurable instruction window size is provided. Here, data storage structures of a CPU (e.g., 104-1) or a core (102-1) of microprocessor 100 that implement the instruction window size can be overprovisioned with extra entries that can be activated (undarkened) in certain operating conditions such as in cryogenic operation (where electrical resistance is lower) or at lower (underclocked) clock frequencies. Such data store structures may include register files, rename tables, reorder buffers, etc. The instruction window size can be increased by using these extra entries. If an increased instruction window size is not need then these extra overprovisioned entries can be darkened or otherwise put in a low power state (e.g., clock gated). Whether to use the extra entries to increase the instruction window size can depend on the level of instruction-level parallelism in the instructions of the compute application or the portion of the compute application being executed by the CPU. If there is a high-level of instruction-level parallelism in the instructions, then the extra entries can be used. If there is a low-level or only an intermediate level of instruction-level parallelism in the instructions, then the extra entries can be darkened or unused.

PROGRAMMED LOGIC SUPPORT

Dynamic configuration logic may be programmed or configured to periodically check for activation-warranting, deactivation-warranting, and configuration-warranting operating conditions according to a programmable or configurable epoch. The epoch may be programmed or configured in terms of a number of clock cycles or a number of nanoseconds, for example. In addition, the dynamic configuration logic may maintain counters and other data to determine if and when an operating condition is met or no longer met. Such counters may include a number of entries of a data storage structure that are being utilized, a memory instruction rate, a cache miss rate, a bandwidth usage, and the like. Based on these counters and data, a dynamic configuration logic may determine that an operating condition is met and accordingly transition a compute resource between states the dark, active-standby, and the non-standby active states.

Compiler-based configuration can also be supported. For example, when compiling programmed instructions of a compute application programmed in a high-level programming language such as C, C++, or the like, the compiler can add an instruction hint to the compiled instructions to use extra overprovisioned entries of a register file based the compiler's knowledge of the register file usage by the programmed instructions acquired during compilation of the programmed instructions into compile instructions (machine code). At execution time, the instruction hint can be detected by dynamic configuration logic and the extra overprovisioned entries of the register file used when the compiled instructions are executed. The hint may apply to all compiled instructions of the compute application or just a portion of them.

Operating system configuration can also be supported. For example, an operating system executing a single-threaded compute application can issue a system call or other low-level call to the CPU upon detecting that the compute application has spawned multiple threads such as, for example, by issuing system calls to the operating system. Dynamic configuration logic can detect the system call or low-level call from the operating system and dynamically configure the pipelines of the CPU from single-threaded mode to simultaneous multithreaded mode, for example, as discussed above with respect to FIG. 6.

CONCLUSION

Thus, a dynamically configurable overprovisioned microprocessor is disclosed. The microprocessor can be overprovisioned with compute resources such as alternate compute resources, long spans of control, or data storage structures with extra headroom. Dynamic configuration logic can detect operating conditions that warrant transitioning compute resources between dark, low-power, and in use states to balance between compute throughput and energy use. While in some embodiments certain overprovisioned compute resources such as, for example, long spans of control, can only be used under certain operating conditions such as in cryogenic operation or when underclocking, other overprovisioned compute resources can still be used at the target clock frequency in room temperature operation by bringing currently unused compute resources dark by power gating or in a low-power state by clock gating. For example, it may be possible take use extra overprovisioned headroom of a register file at the target clock frequency in room temperature operation by darkening or clock gating other unused compute resource so as to reduce power density and stay within the target TDP.

OTHER ASPECTS OF THE DISCLOSURE

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y and Z," is to be understood to convey that an item, term, etc. may be either X, Y or Z, or a combination thereof. Thus, such conjunctive language is not intended to imply that certain embodiments require at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, some embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. An overprovisioned microprocessor comprising:
    at least one first physical compute resource within a core of the overprovisioned microprocessor in a dark power state in a first operating condition;
    at least one second physical compute resource within the core in an active power state;
    a dynamic configuration logic capable of:
        detecting an activation-warranting operating condition;
        undarkening the at least one first physical compute resource responsive to detecting the activation-warranting operating condition;
        detecting a configuration-warranting operating condition; and
        dynamically configuring the overprovisioned microprocessor to use the at least one first physical compute resource responsive to detecting the configuration-warranting operating condition.

2. The overprovisioned microprocessor of claim 1, wherein:
    the dynamic configuration logic is further capable of detecting cryogenic operation of the overprovisioned microprocessor, and
    the activation-warranting operating condition comprises the cryogenic operation of the overprovisioned microprocessor.

3. The overprovisioned microprocessor of claim 1, further comprising:
    a long span of control connecting the at least one first physical compute resource to the at least one second physical compute resource, wherein:
    the long span of control comprises a span of control that is too long to meet signaling timing constraints at a target clock frequency of the overprovisioned microprocessor in the first operating condition, and
    dynamically configuring the overprovisioned microprocessor to use the at least one first physical compute resource comprises configuring the core to use the long span of control.

4. The overprovisioned microprocessor of claim 1, further comprising:
    an in-order instruction execution pipeline comprising the at least one first physical compute resource;
    an out-of-order instruction execution pipeline comprising the at least one second physical compute resource,
    wherein the dynamic configuration logic is capable of dynamically configuring the overprovisioned microprocessor to use the in-order instruction execution pipeline for executing instructions of a compute application and no longer use the out-of-order instruction execution pipeline for executing instructions of the compute application, responsive to detecting the configuration-warranting operating condition.

5. The overprovisioned microprocessor of claim 1, further comprising:
    an in-order instruction execution pipeline comprising the at least one second physical compute resource;
    an out-of-order instruction execution pipeline comprising the at least one first physical compute resource,
    wherein the dynamic configuration logic is capable of dynamically configuring the overprovisioned microprocessor to use the out-of-order instruction execution pipeline for executing instructions of a compute application and no longer use the in-order instruction execution pipeline for executing instructions of the compute application, responsive to detecting the configuration-warranting operating condition.

6. The overprovisioned microprocessor of claim 1, further comprising:
a first load-store unit comprising the at least one first physical compute resource;
an associative load-store unit comprising the at least one second physical compute resource,
wherein the dynamic configuration logic is capable of dynamically configuring the overprovisioned microprocessor to use the first load-store unit for executing memory access requests and no longer use the associative load-store unit for executing memory access requests, responsive to detecting the configuration-warranting operating condition.

7. The overprovisioned microprocessor of claim 1, further comprising:
a first load-store unit comprising the at least one second physical compute resource;
an associative load-store unit comprising the at least one first physical compute resource,
wherein the dynamic configuration logic is capable of dynamically configuring the overprovisioned microprocessor to use the associative load-store unit for executing memory access requests and no longer use the first load-store unit for executing memory access requests, responsive to detecting the configuration-warranting operating condition.

8. The overprovisioned microprocessor of claim 1, further comprising:
a plurality of pipelines, each pipeline of the plurality of pipelines having a respective set of front-end compute resources and a respective set of back-end compute resources, the respective set of front-end compute resources comprising a respective instruction fetch unit, the respective set of back-end compute resources comprising a respective set of functional units;
at least one long span of control connecting a compute resource of the respective set of front-end compute resources of a first pipeline of the plurality of pipelines to a compute resource of the respective set of back-end compute resources of a second pipeline of the pipelines,
wherein:
each of the at least one long span of control comprises a span of control that is too long to meet signaling timing constraints at a target clock frequency of the overprovisioned microprocessor in the first operating condition,
the respective set of back-end compute resources of the first pipeline comprise the at least one second physical compute resource,
the respective set of back-end compute resources of the second pipeline comprise the at least one first physical compute resource, and
the dynamic configuration logic is capable of dynamically configuring the overprovisioned microprocessor to use the respective set of back-end compute resources of the second pipeline responsive to detecting the configuration-warranting operating condition.

9. The overprovisioned microprocessor of claim 8, further comprising:
a configurable instruction issue unit of the respective set of front-end compute resources of the first pipeline capable of sending instructions of a single-threaded compute application executing on the first pipeline over the at least one long span of control to the compute resource of the respective set of back-end compute resources of the second pipeline.

10. The overprovisioned microprocessor of claim 1, wherein the at least one first physical compute resource comprises one or more overprovisioned entries of a data storage structure.

11. The overprovisioned microprocessor of claim 10, wherein the data storage structure is a queue, a register file, a rename table, or a reorder buffer.

12. An overprovisioned microprocessor core comprising:
at least one first physical compute resource in a dark power state in a first operating condition;
at least one second physical compute resource in an active power state;
a dynamic configuration logic capable of:
detecting an activation-warranting operating condition;
transitioning the at least one first physical compute resource from the dark power state to an active-standby power state responsive to detecting the activation-warranting operating condition;
detecting a configuration-warranting operating condition; and
dynamically transitioning the at least one first physical compute resource from the active-standby power state to a non-standby power state responsive to detecting the configuration-warranting operating condition.

13. The overprovisioned microprocessor core of claim 12, wherein:
the dynamic configuration logic is further capable of detecting cryogenic operation of the overprovisioned microprocessor core, and
the activation-warranting operating condition comprises the cryogenic operation of the overprovisioned microprocessor core.

14. The overprovisioned microprocessor core of claim 12, further comprising:
a long span of control connecting the at least one first physical compute resource to the at least one second physical compute resource, wherein:
the long span of control comprises a span of control that is too long to meet signaling timing constraints at a target clock frequency of the overprovisioned microprocessor core in the first operating condition, and
dynamically configuring the overprovisioned microprocessor core to use the at least one first physical compute resource comprises configuring the overprovisioned microprocessor core to use the long span of control.

15. The overprovisioned microprocessor core of claim 12, further comprising:
an in-order instruction execution pipeline comprising the at least one first physical compute resource;
an out-of-order instruction execution pipeline comprising the at least one second compute resource,
wherein the dynamic configuration logic is capable of dynamically configuring the overprovisioned microprocessor core to use the in-order instruction execution pipeline for executing instructions of a compute application and no longer use the out-of-order instruction execution pipeline for executing instructions of the compute application, responsive to detecting the configuration-warranting operating condition.

16. The overprovisioned microprocessor core of claim 12, further comprising:
an in-order instruction execution pipeline comprising the at least one second physical compute resource;

an out-of-order instruction execution pipeline comprising the at least one first physical compute resource, wherein the dynamic configuration logic is capable of dynamically configuring the overprovisioned microprocessor core to use the out-of-order instruction execution pipeline for executing instructions of a compute application and no longer use the in-order instruction execution pipeline for executing instructions of the compute application, responsive to detecting the configuration-warranting operating condition.

17. The overprovisioned microprocessor core of claim 12, further comprising:
a first load-store unit comprising the at least one first physical compute resource;
an associative load-store unit comprising the at least one second physical compute resource,
wherein the dynamic configuration logic is capable of dynamically configuring the overprovisioned microprocessor core to use the first load-store unit for executing memory access requests and no longer use the associative load-store unit for executing memory access requests, responsive to detecting the configuration-warranting operating condition.

18. The overprovisioned microprocessor core of claim 12, further comprising:
a simple load-store unit comprising the at least one second physical compute resource;
an associative load-store unit comprising the at least one first physical compute resource,
wherein the dynamic configuration logic is capable of dynamically configuring the overprovisioned microprocessor core to use the associative load-store unit for executing memory access requests and no longer use the simple load-store unit for executing memory access requests, responsive to detecting the configuration-warranting operating condition.

19. The overprovisioned microprocessor core of claim 12, further comprising:
a plurality of pipelines, each pipeline of the plurality of pipelines having a respective set of front-end compute resources and a respective set of back-end compute resources, the respective set of front-end compute resources comprising a respective instruction fetch unit, the respective set of back-end compute resources comprising a respective set of functional units;
at least one long span of control connecting a compute resource of the respective set of front-end compute resources of a first pipeline of the plurality of pipelines to a compute resource of the respective set of back-end compute resources of a second pipeline of the pipelines,
wherein:
each of the at least one long span of control comprises a span of control that is too long to meet signaling timing constraints at a target clock frequency of the overprovisioned microprocessor core in the first operating condition,
the respective set of back-end compute resources of the first pipeline comprise the at least one second physical compute resource,
the respective set of back-end compute resources of the second pipeline comprise the at least one first physical compute resource, and
the dynamic configuration logic is capable of dynamically configuring the overprovisioned microprocessor core to use the respective set of back-end compute resources of the second pipeline responsive to detecting the configuration-warranting operating condition.

20. The overprovisioned microprocessor core of claim 19, further comprising:
a configurable instruction issue unit of the respective set of front-end compute resources of the first pipeline capable of sending instructions of a single-threaded compute application executing on the first pipeline over the at least one long span of control to the compute resource of the respective set of back-end compute resources of the second pipeline.

* * * * *